United States Patent [19]

Pla

[11] Patent Number: 5,789,678
[45] Date of Patent: Aug. 4, 1998

[54] METHOD FOR REDUCING NOISE AND/OR VIBRATION FROM MULTIPLE ROTATING MACHINES

[75] Inventor: Frederic Ghislain Pla, Clifton Park, N.Y.

[73] Assignee: General Electric Company, Schenectady, N.Y.

[21] Appl. No.: 734,825

[22] Filed: Oct. 22, 1996

[51] Int. Cl.$^6$ ........................................... G01N 1/00
[52] U.S. Cl. ........................... 73/660; 244/1 N; 364/574; 381/71; 416/34
[58] Field of Search .................. 73/660; 244/1 N; 416/34, 33; 381/71; 3634/574, 508

[56] References Cited

U.S. PATENT DOCUMENTS

| | | | |
|---|---|---|---|
| 4,689,821 | 8/1987 | Salikuddin et al. | 381/71 |
| 4,947,356 | 8/1990 | Elliott et al. | |
| 5,148,402 | 9/1992 | Magliozzi et al. | 244/1 X |
| 5,150,855 | 9/1992 | Kaptein | 244/1 N |
| 5,221,185 | 6/1993 | Pla et al. | |
| 5,453,943 | 9/1995 | Magliozzi | 244/1 |
| 5,551,649 | 9/1996 | Kaptein | 244/1 N |

OTHER PUBLICATIONS

Johnston et al., "Propeller Signatures and Their Use", AIAA 80-1035 (1980).

*Primary Examiner*—Hezron E. Williams
*Assistant Examiner*—Nashmiya Ashraf
*Attorney, Agent, or Firm*—Douglas E. Erickson; Marvin Snyder

[57] ABSTRACT

A method for reducing the total operating noise and/or the total vibration of at least two generally-identical rotating machines. In one embodiment, the noise (or vibration) contribution of each machine at a predetermined reference relative phase angle is estimated. Optimum phase angles are calculated by minimizing a cost function which includes such estimated noise (or vibration) contributions and each rotating machine's relative phase angle. In another embodiment, the gradient of a weighted sum of a measure of the magnitude of the acoustic pressure amplitude of the total operating noise (or the amplitude of the total vibration) is measured. Each machine phase angle is adjusted by a predetermined increment opposite in sign to its associated gradient. The measuring and adjusting are repeated until the gradient is within a limit.

9 Claims, 6 Drawing Sheets

FIG. 7

METHOD FOR REDUCING NOISE AND/OR VIBRATION FROM MULTIPLE ROTATING MACHINES

BACKGROUND OF THE INVENTION

The present invention relates generally to rotating machinery, and more particularly to a method for reducing the total operating noise and/or the total vibration from multiple, generally-identical, rotating machines.

Multiple, generally-identical rotating machines include, but are not limited to, aircraft engines for jet or propeller aircraft, gas or steam turbines for electric-power plants, and cooling fans for electrical or electronic equipment. Such rotating machines each have one or more rows of rotating blades which produce noise and vibration having a fundamental frequency which is the blade passage frequency. For example, propeller noise generated by two- or four-engine aircraft results in large noise levels inside the passenger cabin. A large part of this noise is due to propeller airborne noise transmitted through the fuselage. Small differences in RPM (revolutions-per-minute) between engines result in sound waves from each propeller having different frequencies, thus generating a sound pressure level inside the cabin which is slowly varying with time and which is known as "acoustic beats". These beats, which are experienced by passengers in virtually all propeller commuter aircraft and in some turbofan aircraft, are annoying and responsible for a high perceived cabin noise level.

Known noise reduction techniques include one disclosed in U.S. Pat. No. 5,221,185 entitled "Method and Apparatus for Synchronizing Rotating Machinery to Reduce Noise" by Pla et al. which issued Jun. 22, 1993. In that patent, tachometers measured each engine's speed, and a controller kept such speeds generally identical. Microphones measured the total operating noise, and the controller adjusted the relative phases of the rotating machines based on the measured total operating noise.

There is needed an improved method for further reducing total operating noise and/or total vibration of multiple, generally-identical, rotating machines to below those levels reached by known techniques.

SUMMARY OF THE INVENTION

It is an object of the invention to provide a method for reducing the total operating noise and/or total vibration of multiple, generally-identical, rotating machines.

In a first preferred embodiment of the invention, the method is for reducing the total operating noise of at least two generally-identical, rotating machines each rotating at generally the same rotational speed and each rotating at a relative phase angle. The method includes steps a) through e). Step a) includes the step of measuring the total operating noise at at-least-one predetermined location and the corresponding relative phase angle of each of the rotating machines. Step b) includes the step of estimating the noise contribution to the total operating noise measured in step a) of each of the rotating machines at a predetermined reference relative phase angle. Step c) includes the step of defining a cost function which includes the noise contributions estimated in step b) and each rotating machine's relative phase angle. Step d) includes the step of calculating an optimum relative phase angle for each of the rotating machines which minimizes the cost function defined in step c). Step e) includes the step of adjusting each rotating machine's relative phase angle to its associated optimum relative phase angle calculated in step d).

In a second preferred embodiment of the invention, the method is for reducing the total operating noise of one master rotating machine and at-least-one slave rotating machine, the one master and the at-least-one slave rotating machine being generally-identical and rotating at generally the same rotational speed with the at-least-one slave rotating machine rotating at a relative phase angle with respect to the one master rotating machine. The method includes steps a) through c). Step a) includes the step of measuring the gradient of a weighted sum of a measure of the magnitude of the acoustic pressure amplitude of the total operating noise, with the gradient taken with respect to relative phase angle, and with the weighted sum taken over the at-least-one predetermined location. Step b) includes the step of adjusting the relative phase angle for each of the at-least-one slave rotating machine by a predetermined increment of the negative of the associated gradient measured in step a). Step c) includes the step of repeating steps a) and b) until the gradient measured in step a) is within a predetermined limit.

In a third preferred embodiment of the invention, the method is for reducing the total vibration of at least two generally-identical, rotating machines each rotating at generally the same rotational speed and each rotating at a relative phase angle. The method includes steps a) through e). Step a) includes the step of measuring the total vibration at at-least-one predetermined location and the corresponding relative phase angle of each of the rotating machines. Step b) includes the step of estimating the vibration contribution to the total vibration measured in step a) of each of the rotating machines at a predetermined reference relative phase angle. Step c) includes the step of defining a cost function which includes the vibration contributions estimated in step b) and each rotating machine's relative phase angle. Step d) includes the step of calculating an optimum relative phase angle for each of the rotating machines which minimizes the cost function defined in step c). Step e) includes the step of adjusting each rotating machine's relative phase angle to its associated optimum relative phase angle calculated in step d).

In a fourth preferred embodiment of the invention, the method is for reducing the total vibration of one master rotating machine and at-least-one slave rotating machine, the one master and the at-least-one slave rotating machine being generally-identical and rotating at generally the same rotational speed with the at-least-one slave rotating machine rotating at a relative phase angle with respect to the one master rotating machine. The method includes steps a) through c). Step a) includes the step of measuring the gradient of a weighted sum of a measure of the magnitude of the amplitude of the total vibration, with the gradient taken with respect to relative phase angle, and with the weighted sum taken over the at-least-one predetermined location. Step b) includes the step of adjusting the relative phase angle for each of the at-least-one slave rotating machine by a predetermined increment of the negative of the associated gradient measured in step a). Step c) includes the step of repeating steps a) and b) until the gradient measured in step a) is within a predetermined limit.

Several benefits and advantages are derived from the invention. In the first (or third) preferred embodiment, the method includes estimating the individual noise (or vibration) contributions of each of the rotating machines, leading to a lower noise (or vibration) minimization than is possible without such individual noise (or vibration) estimation, especially when there are more than two rotating machines. In the second (fourth) preferred embodiment, the method adjusts the relative phase angles based on a measurement of the gradient of a weighted sum of a measure of the magnitude of the acoustic pressure amplitude of the total noise (or amplitude of the total vibration), allowing for easier implementation than is possible with more mathematically complicated noise (or vibration) reduction techniques.

BRIEF DESCRIPTION OF THE DRAWINGS

The accompanying drawings illustrate several preferred embodiments of the present invention for reducing noise and/or vibration from rotating machines wherein.

DETAILED DESCRIPTION OF THE INVENTION

Figure 1:
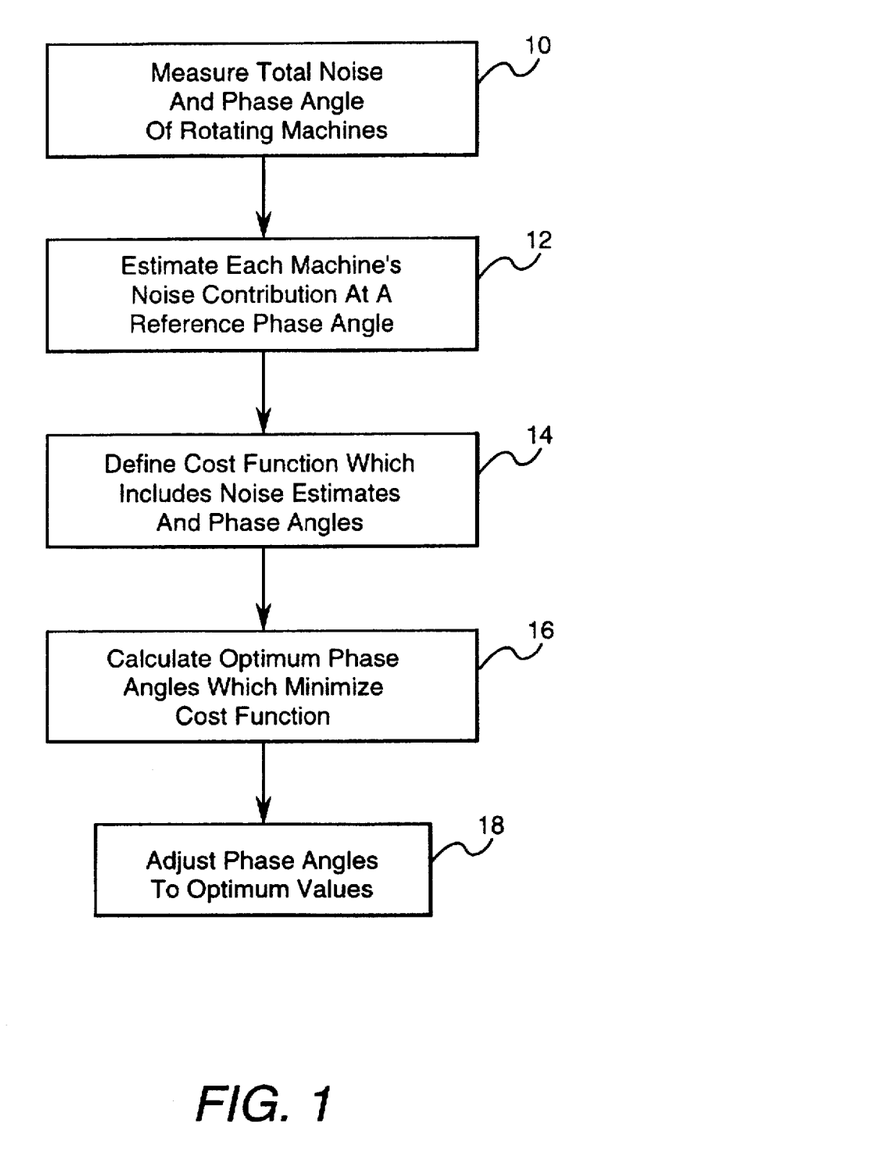
FIG. 1 is a flow chart of a first preferred method which includes measuring the total operating noise.

Referring now to the drawings, FIG. 1 shows a flow chart of a first preferred method of the invention for reducing the total operating noise of at least two generally-identical, rotating machines each rotating at generally the same rotational speed and each rotating at a relative phase angle. Typically, one of the rotating machines is considered a "master" and the other rotating machines are considered "slaves". The relative phase angle of the master machine is considered to be zero, and the relative phase angles of the slave machines are taken in reference to the master machine. In this case, only the relative phase angles of the slave machines are adjusted with respect to the "zero" relative phase angle of the master machine. Less typically, all machines are considered to be slave machines and their relative phase angles are adjusted with respect to a reference mark phase angle.

The first preferred method includes steps a) through e). Step a) is portrayed in block 10 of FIG. 1 as "Measure Total Noise And Phase Angle Of Rotating Machines". Step a) includes measuring the total operating noise at at-least-one predetermined location and the corresponding relative phase angle of each of the rotating machines. The particular type of noise measurement may be a measurement of instantaneous noise amplitude, average noise amplitude, mean-square noise amplitude, etc., and such measurement may be expressed in terms of acoustic pressure, decibels, etc., as can be appreciated by those skilled in the art.

Step b) is portrayed in block 12 of FIG. 1 as "Estimate Each Machine's Noise Contribution At A Reference Phase Angle". Step b) includes estimating the noise contribution to the total operating noise measured in step a) of each of the rotating machines at a predetermined reference relative phase angle. A preferred predetermined reference relative phase angle is a zero relative phase angle. Techniques for estimating in step b) include estimating using a multiple phase-sets measurement technique, estimating using a synchronous averaging technique, and estimating using an adaptive amplitude-phase estimation technique. The multiple phase-sets measurement technique has been used in the past to identify individual propeller signatures (Johnston et al., "Propeller Signatures and Their Uses", AIAA 80-1035 1980). Such estimated noise contribution is the amplitude and phase of the transfer functions characterizing the propagation of noise between each rotating machine and each measurement location.

Step c) is portrayed in block 14 of FIG. 1 as "Define Cost Function Which Includes Noise Estimates And Phase Angles". Step c) includes defining a cost function which includes the noise contributions estimated in step b) and each rotating machine's relative phase angle. Preferably, the noise contributions are expressed in terms of acoustic pressure, and the cost function is expressed in terms which include a measure of the magnitude of the acoustic pressure amplitude.

Step d) is portrayed in block 16 of FIG. 1 as "Calculate Optimum Phase Angles Which Minimize Cost Function". Step d) includes calculating an optimum phase angle for each of the rotating machines which minimizes the cost function defined in step c). Preferably, such calculating is accomplished by using either a systematic technique, a steepest-descent minimization method, or an exact closed-form solution to the minimization problem, as is known to those skilled in the art.

Step e) is portrayed in block 18 of FIG. 1 as "Adjust Phase Angles To Optimum Values". Step e) includes adjusting each rotating machine's relative phase angle to its associated optimum relative phase angle calculated in step d). Small changes in the "minimum-noise" optimum phases due to small changes in flight conditions can be compensated for automatically using small perturbations of the phase command signals (command signal dithering). The perturbations allow a multiple-dimension noise gradient to be calculated as a function of all relative phase perturbations. This gradient can be used to ensure the system stays at its minimum-noise point. Typically, the system continuously monitors its performance, making small adjustments to ensure optimum conditions. For significant changes in operating conditions (to be determined by experimentation, such as aircraft configuration and flight conditions when the rotating machines are aircraft engines), it might be necessary to re-initialize the system. In that case, steps a) through d) are performed again. Optimum relative phases can be stored in a matrix for each operating condition. These values can be used as a starting point if the current operating conditions are close to a previously operating condition, or while calculating a new set of optimum relative phase angles. The tables can be updated on a regular basis to ensure optimum operation. In addition, new values can be added to the table automatically as new operating conditions are encountered. Phases corresponding to operating conditions which are not in the table can be estimated by interpolating available data.

An example will now be given to mathematically illustrate some of the steps of the invention. In the example shown in FIGS. 2 and 3, the rotating machines consist of four in number and are rotating-propeller aircraft engines 20, 22, 24, and 26.

Figure 2:
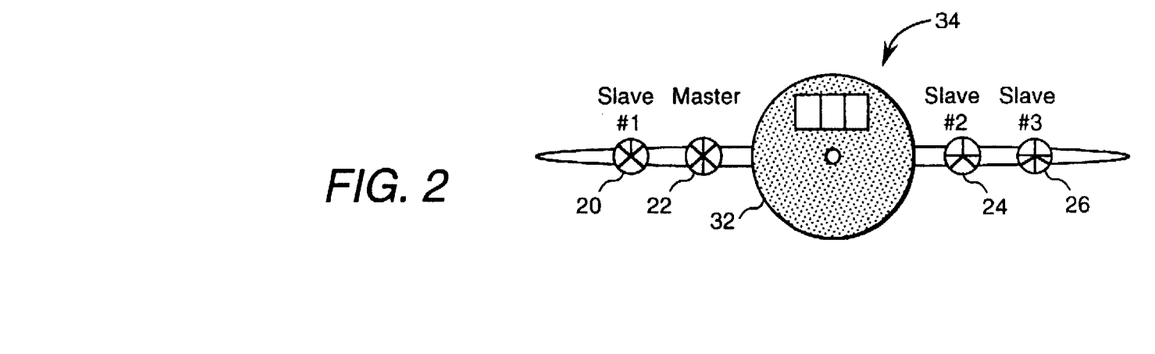
FIG. 2 is a schematic front-elevational view of a four-engine propeller aircraft.
Figure 3:
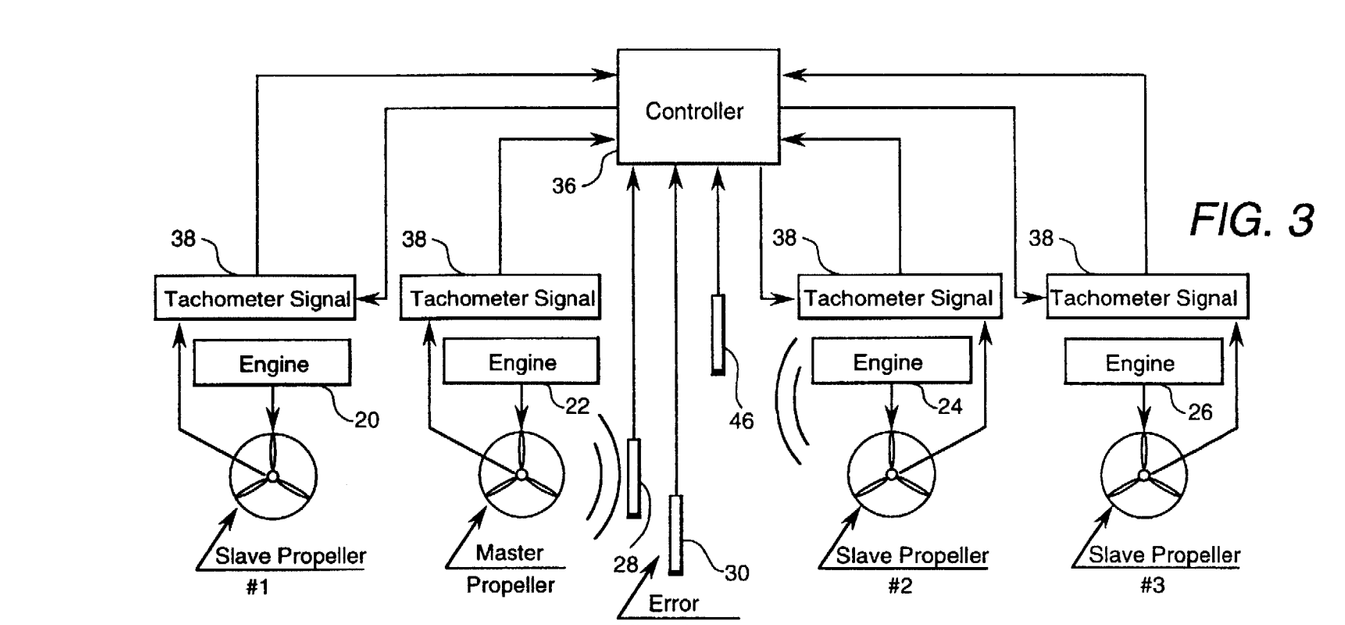
FIG. 3 is a schematic diagram of a preferred system for implementing the first preferred method of the present invention on the aircraft of FIG. 2.

In step a), microphones (only two of which are shown in the figures) 28 and 30 are used to measure the total operating noise at different predetermined locations inside the cabin 32 of the aircraft 34. A controller (e.g., digital computer) 36 receives the microphone inputs and is programmed to express such inputs as measurements of, for example, pressure amplitudes or mean-square acoustic pressure, as can be accomplished by those skilled in the art.

In step b), a multiple phase-sets measurement technique may be used for estimating the noise contribution of each of the aircraft engines 20, 22, 24, and 26 as follows.

Assuming linearity, and considering the blade passage frequency alone, the noise at a microphone is equal to the sum of the contributions from each propeller:

$$P = RE(A_T e^{j\psi}) = Re(A_1 e^{j(\theta_1)} + A_2 e^{j(\theta_2 + \phi_2)} + A_3 e^{j(\theta_3 + \phi_3)} + A_4 e^{j(\theta_4 + \phi_4)})$$

where $\theta$'s are the phases of the tone generated by each propeller with respect to an arbitrary propeller reference position (propagation delay along the noise path), $\phi$'s are the relative phase angles between each propeller and the master propeller, and A's are the amplitudes of the contribution from each propeller.

$A_T$ and $\phi$ are easily obtained by Fourier transforming the noise signal measured at the microphone. The $\phi$'s can be obtained using one-per revolution signals from sensors mounted on each engine.

The contribution from each engine is contained in the four phases and four amplitude terms ($\theta$'s and A's) which can be represented as four complex terms. Contributions from each engine can then be determined by taking at least four measurements for four different relative phase angles between propellers thus yielding a system with four equations and four unknowns.

This method can be extended to include several microphones and several frequencies at the same time. The noise at each microphone and for several measurements can be represented in matrix form as:

$$[P_{av}] = [\psi][\Theta]$$

where [$\psi$] is a known matrix representing the relative phase angles between propellers at the time the noise measurements are taken. [$\Theta$] is the unknown matrix containing phase and amplitude noise path information between each engine and each microphone. The solution of the system is straightforward and is given by:

$$[\Theta] = ([\psi]^T [\psi])^{-1} [\psi]^T [P_{av}]$$

where [$\Theta$] contains all the information required to calculate the relative phase angle between propellers which results in minimum cabin noise.

One drawback of the direct method is that it operates in the frequency domain and thus requires "time-blocks" of the microphone signal to be Fourier transformed. Phase angles between propellers must be kept relatively constant during the acquisition of each time segment in order for the analysis to be valid since continuous phase angle variations will introduce an error in the estimation of the noise path matrix [$\Theta$]. This problem can be minimized as follows:

Lock the phases of the propellers each time a new noise measurement is made. An estimate of the shift in phase angle during data acquisition can be taken by looking at the engine pulses. If the change is higher than a preset value (such as ± one degree), then the data point is not valid, and the data must be acquired again.

Use advanced signal processing techniques for unsteady signals such as Short-Time Fourier Transforms (STFT).

The multiple phase-sets measurement technique can be implemented using a custom stand-alone system or off-the-shelf hardware and software. Standard Analog-to-Digital (A/D) converters and sample-and-hold circuitry are used to sample the microphone signals. A/D conversion is triggered by signals from one-per-revolution sensors or encoders mounted on each propeller shaft. Digital counters can be used to estimate the relative phase between propellers based on the signals from the one-per-revolution sensors or encoders. Final estimation of the noise path matrix [$\Theta$] can be performed on a standard computer central processing unit (CPU) using standard Fast Fourier Transform (FFT) and matrix manipulation software.

As a first alternative in step b), a synchronous averaging technique, performed by the controller 36 may be used for estimating the noise contributions of each of the aircraft engines as follows. For simplicity, only two engines 22 and 24 and one microphone 28 will be considered.

The synchronous averaging method relies on a well known and often used experimental technique in the analysis of rotating machinery and propeller signals. It is best explained by describing a twin-engine, single microphone application.

The noise from two propellers rotating at slightly different speeds is picked up by a microphone. A pulse from the left-engine one-per-revolution sensor is used to trigger the data acquisition system which samples a "block" of data from the microphone. Since the start of the acquisition is triggered by the left-engine, the phase of the noise contribution from the left engine will be the same for each block of data. However, if the speed (or frequency) of the right engine is slightly different from the speed of the left engine, the phase of the noise contribution from the right engine will be different for each block of data. As averaging of the data blocks is performed, noise from the left engine adds constructively, while noise from the right engine adds destructively. Therefore, for a large number of averages, only the noise from the left engine contributes significantly to the average. The final averaged data are then Fourier transformed to provide the desired phase and amplitude information ([$\Theta$]).

A potential problem with this method is "smearing" in the frequency spectrum and phase information as individual blocks are acquired, due to variations in the speed of the left propeller as averaging is performed. This problem can be solved by locking the sampling rate of the data acquisition system to the rotational speed of the left-engine as follows: the one-per-revolution pulse is passed through a frequency multiplier and used to drive the external sampling clock of the data acquisition system. For instance, the frequency multiplier can be adjusted to take 256 samples per 360-degree rotation of the propeller. For each data block, each data point will now be sampled at the same propeller phase angle. When the averaged data are Fourier transformed, the results are now obtained in terms of harmonics of the blade passage number rather than in terms of harmonics of the blade passage frequency. This technique is widely used for the analysis of rotating machinery and is a standard option on most Fast Fourier Transform (FFT) analyzers and data acquisition systems. An alternative to the combination of a 1-per-rev signal and a frequency multiplier is to use a shaft encoder to generate a number of pulses (128, 256, . . .) at fixed shaft angular locations.

This method is directly applicable to the four-engine case. Pulses from each engine are used as triggers and synchronous sampling references to identify the contribution from each engine to each microphone ([$\Theta$]) simultaneously. Several engines and microphones locations can be acquired and processed simultaneously or one after the other depending on the hardware design. The time required for acquisition depends on the accuracy required, and on the difference in speed between propellers. The implementation of the method is straightforward and can be performed using standard FFT analyzers, or a stand-alone data acquisition system.

As a second alternative in step b), an adaptive amplitude/phase estimation technique performed by the controller 36 may be used for estimating the noise contributions of each of the aircraft engines as follows.

A typical implementation of this approach can be described as follows. A signal related to the propeller shaft rotation (such as a shaft encoder signal) is used to generate a periodic signal at the propeller BPF (blade passage frequency) and its significant harmonics (in a noise sense). This signal is sampled and fed to an adaptive estimator which can adjust the phase and amplitude of each frequency component in the signal. The adjusted signal is then subtracted from the microphone signal at which the individual propeller contribution is required. The resulting "error" signal is used as a feedback signal to "adapt" the coefficients of the filter until the output of the filter matches the microphone signal. When a perfect match (or very close) is obtained, the "error" signal is zero (or very small) and the adaptation process essentially turns off. The coefficients of the filter contain tan transfer function representing the phase and amplitude information characterizing the noise propagation path between the propeller and the microphone.

The adaptive estimator can be implemented in the time domain (adaptive filter) or in the frequency domain. In the time domain, individual taps in the filter can be related to magnitude and phase of individual frequency components via a simple Fourier transform. As described previously, "smearing errors" can be minimized by sampling the microphone signals on a fixed time basis only if the speed of the engine is steady. For a non-steady engine speed, the sampling rate can be locked to the rotational speed of the engine. In addition, this technique usually requires the other engines to operate at different frequencies so as not to "fool" the adaptive estimator.

In step c), the cost function may be defined in the controller 36 as the summation of, for example, pressure amplitudes or the mean-square acoustic pressures at several microphones 28 and 30 located over the entire cabin 32. The use of this cost function attempts to minimize the average noise inside the entire cabin. Enough microphones 28 and 30 must be used for the method to be effective. An alternate cost function is the summation of pressure amplitudes or the mean-square acoustic pressures at the few predetermined locations where noise is the highest. The use of this cost function places special emphasis on the predetermined locations where noise is the highest (such as in the propeller plane) and has been shown to correlate to global noise reduction in an aircraft cabin due to synchrophasing. Other microphone predetermined locations can be included with a proper weighting coefficient in order to reduce or control their effect on the optimization process.

In step d), a systematic technique may be used by the controller 36 for calculating the optimum relative phase angle for each engine 20, 22, 24, and 26 which minimizes the cost function.

The magnitude of the noise at each microphone can be reconstructed for various relative phase angles between propellers ($|\psi|$) using:

$$[P_{av}] = [\psi][\Theta]$$

The systematic technique calculates the cost function for all possible phase angle combinations, looking for the combination yielding the lowest cost function.

Although this systematic approach is not very sophisticated, it is very effective in this application due to the speed at which the cost function can be calculated.

As a first alternative in step d), a steepest-descent minimization method may be used by the controller 36 for calculating the optimum relative phase angle for each engine 20, 22, 24, and 26 which minimizes the cost function.

In this approach, the cost function used is the mean square pressure or the pressure amplitude measured by several microphones located inside the cabin.

The total sound field at each microphone can be expressed as the summation of a primary sound field (such as generated by one or two master propellers) and a canceling sound field (such as generated by two or three slave propellers). It can typically be shown that the total mean square pressure is a single-minimum function of a phase function for the slave propellers generating the canceling sound field. Since the cost function has a single minimum, there is usually one value of the phase function which corresponds to the "minimum-noise" situation. This value can be used to derive the propeller phases which minimize noise inside the cabin.

In the direct method, the minimum value is obtained readily by solving for the zero of the first derivative of the cost function using standard matrix algebra.

In the indirect method, the minimum value is obtained iteratively using a gradient descent algorithm such as the multiple-input, multiple-output LMS (least-mean-square) algorithm or Newton's method. The advantage of the indirect method compared to the direct one is reduced computational complexity.

Figure 4:
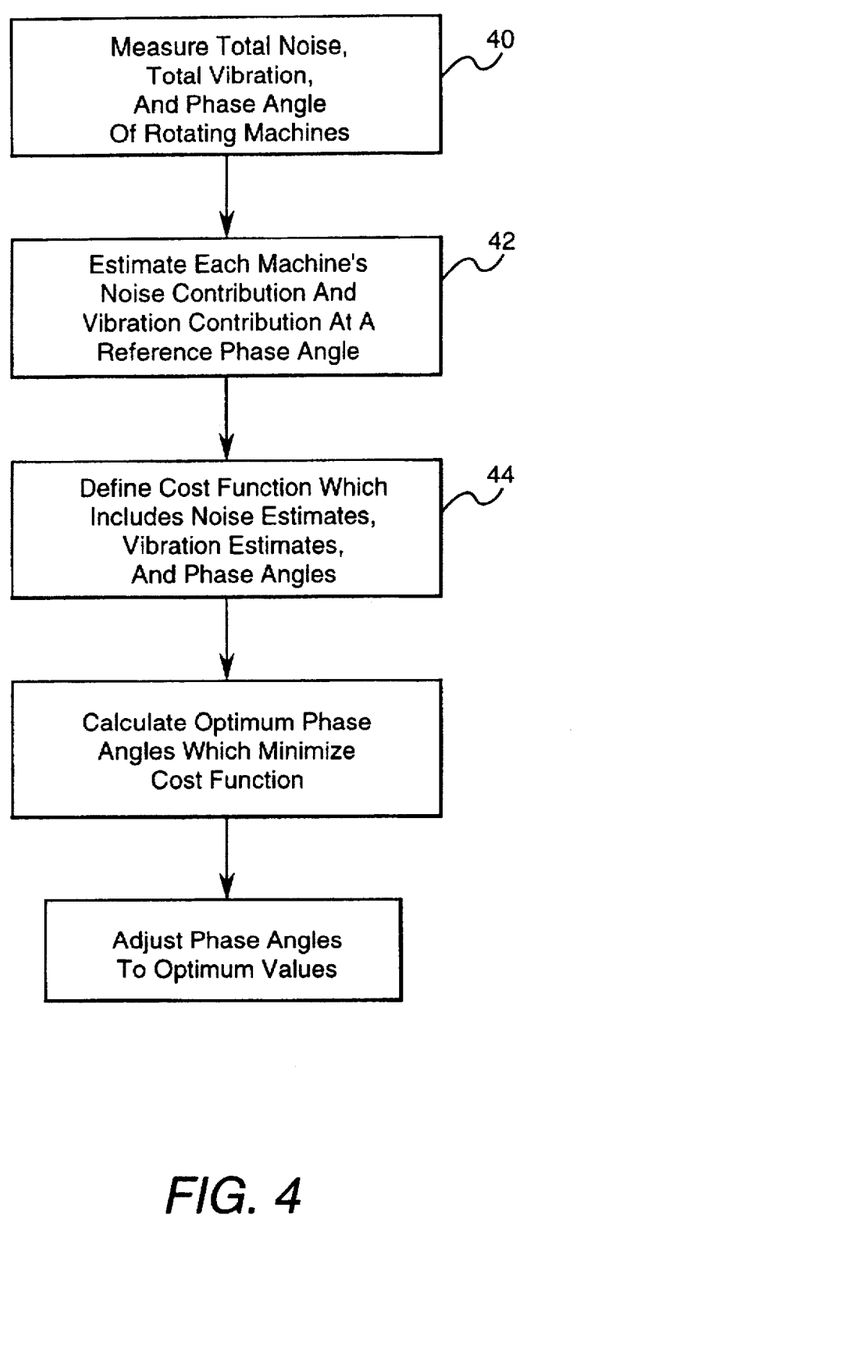
FIG. 4 is the flow chart of FIG. 1 expanded to also include measuring the total vibration.

In step e), the controller 36 uses a conventional phase-lock control loop to adjust (and maintain) each relative phase angle to its associated optimum relative phase angle, as can be understood by the artisan. It is noted that the requirement of having the same rotational speed for the engines 20, 22, 24, and 26 may be accomplished by the controller 36 using tachometers 38 in a speed-control loop as disclosed in the previously-cited U.S. Pat. 5,221,185. Preferably, as shown in FIG. 4, the method also includes the steps of measuring the total vibration caused by the rotating machines (e.g., aircraft engines 22, 24, 26, and 28) at at-least-one prechosen location (e.g., prechosen locations within the cabin 32 of the aircraft 34) and the corresponding phase angle of each of the rotating machines as shown in block 40 of FIG. 4 and estimating the vibration contribution to the measured total vibration of each of the rotating machines at a predetermined reference relative phase angle as shown in block 42 of FIG. 4. In this method, the cost function also includes the estimated vibration contributions and each rotating machine's relative phase angle as shown in block 44 of FIG. 4. It is preferred that accelerometers (only one of which is shown in the figures) 46 are used for the vibration measurements. The method mathematically is a straight-forward extension of the first preferred method, such extension being within the level of skill of the artisan.

Figure 5:
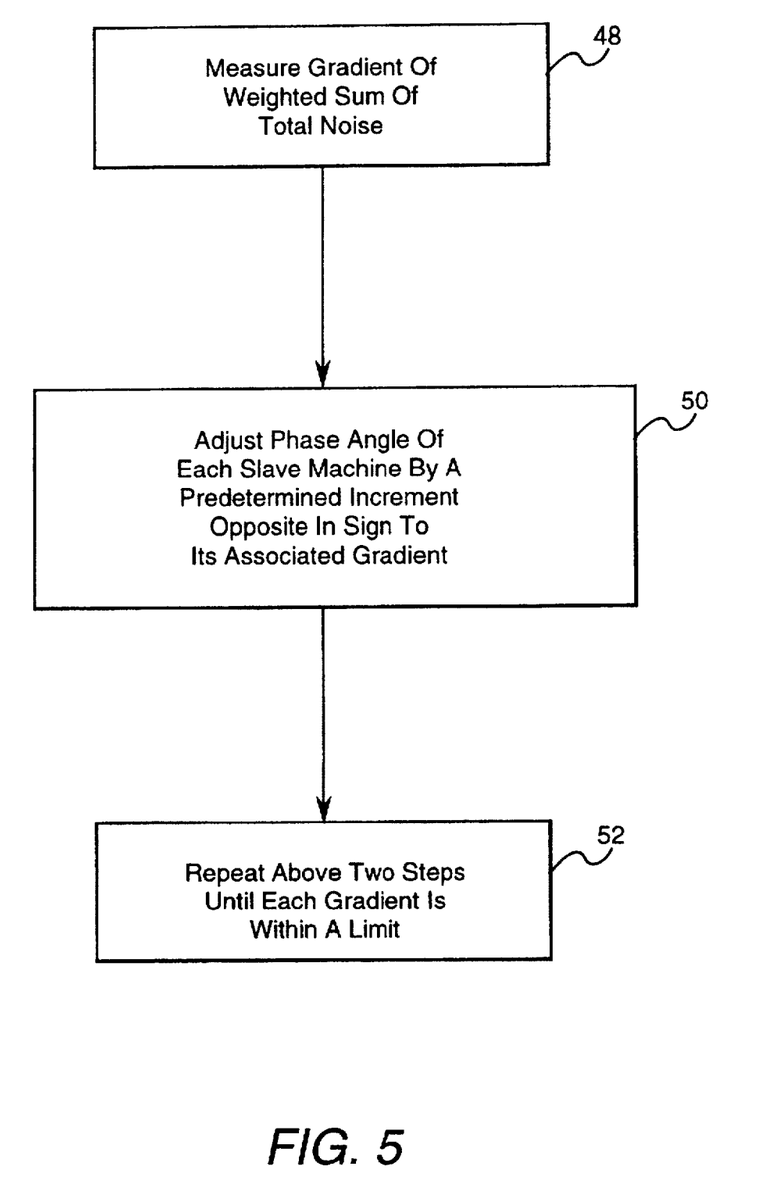
FIG. 5 is a flow chart of a second preferred method which includes measuring the gradient of a weighted sum of a measure of the magnitude of the acoustic pressure amplitude of the total noise.

Referring again to the drawings, FIG. 5 shows a flow chart of a second preferred method of the invention for reducing the total operating noise of one master rotating machine and at-least-one slave rotating machine. The one master and the at-least-one slave rotating machine are generally-identical and rotate at generally the same rotational speed with the at-least-one slave rotating machine rotating at a relative phase angle with respect to the one master rotating machine.

The second preferred method includes steps a) through c). Step a) is portrayed in block 48 of FIG. 5 as "Measure Gradient Of Weighted Sum Of Total Noise". Step a) includes measuring the gradient of a weighted sum of a measure of the magnitude of the acoustic pressure amplitude of the total operating noise, such gradient taken with respect to relative phase angle, and such weighted sum taken over the at-least-one predetermined location. Preferably, the gradient for one slave machine is measured at one predetermined location as follows. The total noise is measured at the one predetermined location for fixed values of the relative phase angles of all slave machines. Then the relative phase angle of only the one slave machine is changed to a new value, and the total noise is again measured. The gradient is measured as the difference in the total noise divided by the difference in phase angle by the controller 36. Preferably, the gradient at a plurality of predetermined locations for one slave machine is measured by the controller 36 as the sum of the gradients (with all weighting factors being equal to unity) at each predetermined location of the one slave machine. It may also be possible to measure the gradient for all slave machines at the same time.

Step b) is portrayed in block 50 of FIG. 5 as "Adjust Phase Angle Of Each Slave Machine By A Predetermined Increment Opposite In Sign To Its Associated Gradient". Step b) includes adjusting the relative phase angle for each of the at-least-one slave rotating machine by a predetermined increment opposite in sign to its associated gradient measured in step a). Preferably a small increment, such as five percent of the measured gradient divided by the number of measurement predetermined locations or an arbitrary fixed value, is used. This method will converge to a minimum-noise condition and ensure that the minimum-noise condition is enforced at all times regardless of changes in the operating (e.g., flight) conditions. The speed at which the minimum-noise condition is reached is a function of the response time of the machines (e.g., engines).

Step c) is portrayed in block 52 of FIG. 5 as "Repeat Above Two Steps Until Each Gradient Is Within A Limit". Step c) includes repeating steps a) and b) until the gradient measured in step a) is within a predetermined limit. It is noted that the system hardware for the second preferred method is similar to that of the first preferred method shown in FIG. 3.

Figure 6:
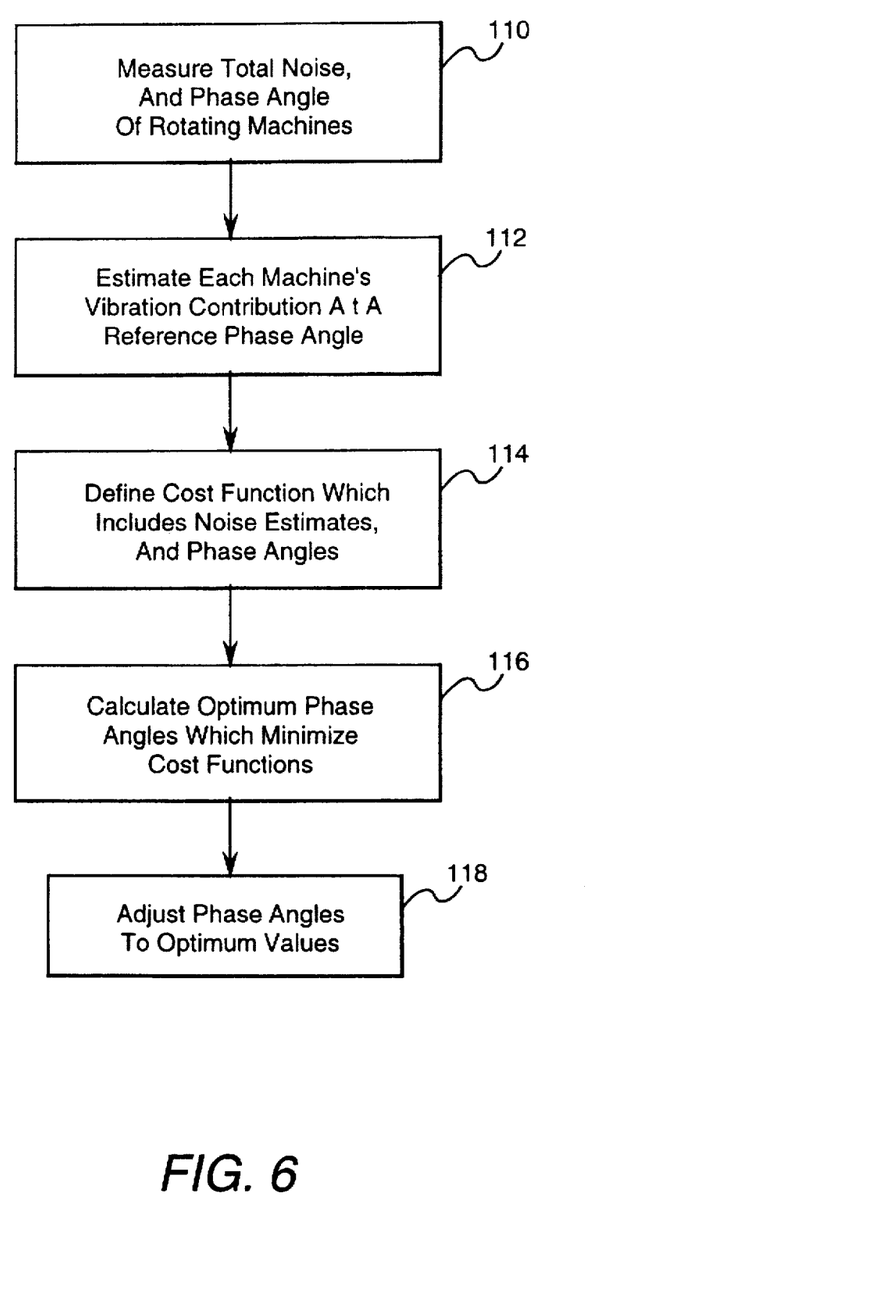
FIG. 6 is a flow chart of a third preferred method which includes measuring the total vibration.

Referring again to the drawings, FIG. 6 shows a flow chart of a third preferred method of the invention for reducing the total vibration of at least two generally-identical, rotating machines each rotating at generally the same rotational speed and each rotating at a relative phase angle.

The third preferred method includes steps a) through e). Step a) is portrayed in block 110 of FIG. 6 as "Measure Total Vibration And Phase Angle Of Rotating Machines". Step a) includes measuring the total vibration at at-least-one predetermined location and the corresponding relative phase angle of each of the rotating machines. The particular type of vibration measurement may be a measurement of instantaneous vibration amplitude, average vibration amplitude, mean-square vibration amplitude, etc.

Step b) is portrayed in block 112 of FIG. 6 as "Estimate Each Machine's Vibration Contribution At A Reference Phase Angle". Step b) includes estimating the vibration contribution to the total vibration measured in step a) of each of the rotating machines at a predetermined reference relative phase angle. A preferred predetermined reference relative phase angle is a zero relative phase angle. Techniques for estimating in step b) are identical to those for estimating in step b) of the previously-described first preferred method of the invention. Such estimated vibration contribution is the amplitude and phase transfer function characterizing the propagation of vibration between each rotating machine and each vibration measurement location.

Step c) is portrayed in block 114 of FIG. 6 as "Define Cost Function Which Includes Vibration Estimates And Phase Angles". Step c) includes defining a cost function which includes the vibration contributions estimated in step b) and each rotating machine's relative phase angle. Preferably, the vibration contributions are expressed in terms of displacement, and the cost function is expressed in terms which include a measure of the magnitude of the amplitude of the displacement. The math is the same as that in step c) of the previously-described first preferred embodiment of the invention.

Step d) is portrayed in block 116 of FIG. 6 as "Calculate Optimum Phase Angles Which Minimize Cost Function". Step d) includes calculating an optimum phase angle for each of the rotating machines which minimizes the cost function defined in step c). Preferably, such calculating, which is the same as that in step d) of the previously-described first embodiment of the invention, is accomplished by using either a systematic technique or a steepest-descent minimization method.

Step e) is portrayed in block 118 of FIG. 6 as "Adjust Phase Angles To Optimum Values". Step e) includes adjusting each rotating machine's relative phase angle to its associated optimum relative phase angle calculated in step d). Small changes in the "minimum-vibration" optimum phases due to small changes in flight conditions can be compensated for automatically using small perturbations of the phase command signals (command signal dithering), as found in the previous discussion for step e) of the first preferred embodiment of the invention.

Figure 7:
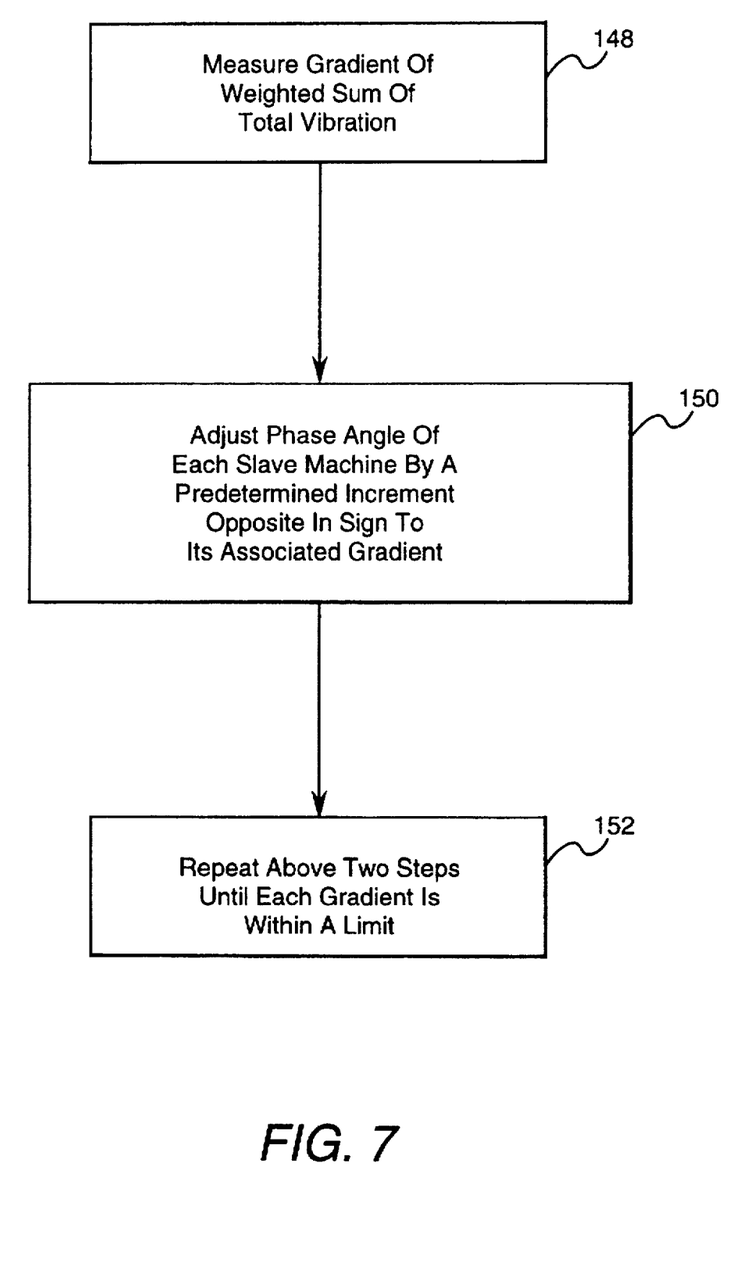
FIG. 7 is a flow chart of a fourth preferred method which includes measuring the gradient of a weighted sum of a measure of the magnitude of the amplitude of the total vibration.

Referring again to the drawings, FIG. 7 shows a flow chart of a fourth preferred method of the invention for reducing the total vibration of one master rotating machine and at-least-one slave rotating machine. The one master and the at-least-one slave rotating machine are generally-identical and rotate at generally the same rotational speed with the at-least-one slave rotating machine rotating at a relative phase angle with respect to the one master rotating machine.

The fourth preferred method includes steps a) through c). Step a) is portrayed in block 148 of FIG. 7 as "Measure Gradient Of Weighted Sum Of Total Vibration". Step a) includes measuring the gradient of a weighted sum of a measure of the magnitude of the amplitude of the total vibration, such gradient taken with respect to relative phase angle, and such weighted sum taken over the at-least-one predetermined location. Preferably, the gradient for one slave machine is measured at one predetermined location as follows. The total vibration is measured at the one predetermined location for fixed values of the relative phase angles of all slave machines. Then the relative phase angle of only the one slave machine is changed to a new value, and the total vibration is again measured. The gradient is measured as the difference in the total vibration divided by the difference in phase angle by the controller 36. Preferably, the gradient at a plurality of predetermined locations for one slave machine is measured by the controller 36 as the sum of the gradients at each predetermined location of the one slave machine. It may also be possible to measure the gradient for all slave machines at the same time.

Step b) is portrayed in block 150 of FIG. 7 as "Adjust Phase Angle Of Each Slave Machine By A Predetermined Increment Opposite In Sign To Its Associated Gradient". Step b) includes adjusting the relative phase angle for each of the at-least-one slave rotating machine by a predetermined increment opposite in sign to its associated gradient measured in step a). Preferably a small increment, such as five percent of the measured gradient divided by the number of measurement predetermined locations or an arbitrary fixed value, is used. This method will converge to a minimum-vibration condition and ensure that the minimum-vibration condition is enforced at all times regardless of changes in the operating (e.g., flight) conditions. The speed at which the minimum-vibration condition is reached is a function of the response time of the machines (e.g., engines).

Step c) is portrayed in block 152 of FIG. 7 as "Repeat Above Two Steps Until Each Gradient Is Within A Limit". Step c) includes repeating steps a) and b) until the gradient measured in step a) is within a predetermined limit. It is noted that the system hardware for the fourth preferred method is similar to that of the third preferred method which is similar to that of the first preferred method shown in FIG. 3 wherein the only sensors are vibration sensors (e.g., accelerometers 46) with no noise sensors (e.g., microphones 28 and 30) present. It is further noted that certain applications may require combining the first and third preferred methods of the invention or the second and fourth preferred methods of the invention to reduce both noise and vibration.

The foregoing description of several preferred methods of the invention has been presented for purposes of illustration. It is not intended to be exhaustive or to limit the invention to the precise methods disclosed, and obviously many modifications and variations are possible in light of the above teaching. It is intended that the scope of the invention be defined by the claims appended hereto.

We claim:

1. A method for reducing the total operating noise of at least two generally-identical, rotating machines each rotating at generally the same rotational speed and each rotating at a relative phase angle, said method comprising the steps of:

a) measuring the total operating noise at at-least-one predetermined location and the corresponding relative phase angle of each of said rotating machines;

b) estimating the noise contribution to the total operating noise measured in step a) of each of said rotating machines at a predetermined reference relative phase angle;

c) defining a cost function which includes the noise contributions estimated in step b) and each rotating machine's relative phase angle;

d) calculating an optimum relative phase angle for each of said rotating machines which minimizes the cost function defined in step c); and e) adjusting each rotating machine's relative phase angle to each rotating machine's associated optimum relative phase angle calculated in step d).

2. The method of claim 1, wherein step b) includes estimating using a multiple phase-sets measurement technique.

3. The method of claim 1, wherein step b) includes estimating using a synchronous averaging technique.

4. The method of claim 1, wherein step b) includes estimating using an adaptive amplitude-phase estimation technique.

5. The method of claim 1, wherein said rotating machines consist of four in number.

6. The method of claim 5, wherein said rotating machines are rotating-propeller aircraft engines.

7. The method of claim 1, wherein the noise contributions are expressed in terms of acoustic pressure and wherein the cost function is expressed in terms which include a measure of the magnitude of the acoustic pressure amplitude.

8. The method of claim 1, also including the steps of measuring the total vibration caused by said rotating machines at at-least-one prechosen location and estimating the vibration contribution to the measured total vibration of each of said rotating machines at a predetermined reference relative phase angle, and wherein said cost function also includes the estimated vibration contributions and each rotating machine's relative phase angle.

9. A method for reducing the total vibration of at least two generally-identical, rotating machines each rotating at generally the same rotational speed and each rotating at a relative phase angle, said method comprising the steps of:

a) measuring the total vibration at at-least-one predetermined location and the corresponding relative phase angle of each of said rotating machines;

b) estimating the vibration contribution to the total vibration measured in step a) of each of said rotating machines at a predetermined reference relative phase angle;

c) defining a cost function which includes the vibration contributions estimated in step b) and each rotating machine's relative phase angle;

d) calculating an optimum relative phase angle for each of said rotating machines which minimizes the cost function defined in step c); and e) adjusting each rotating machine's relative phase angle to each rotating machine's associated optimum relative phase angle calculated in step d).

* * * * *